H. WINKLER.
AIR FILTER.
APPLICATION FILED APR. 5, 1911.
1,002,618.
Patented Sept. 5, 1911.
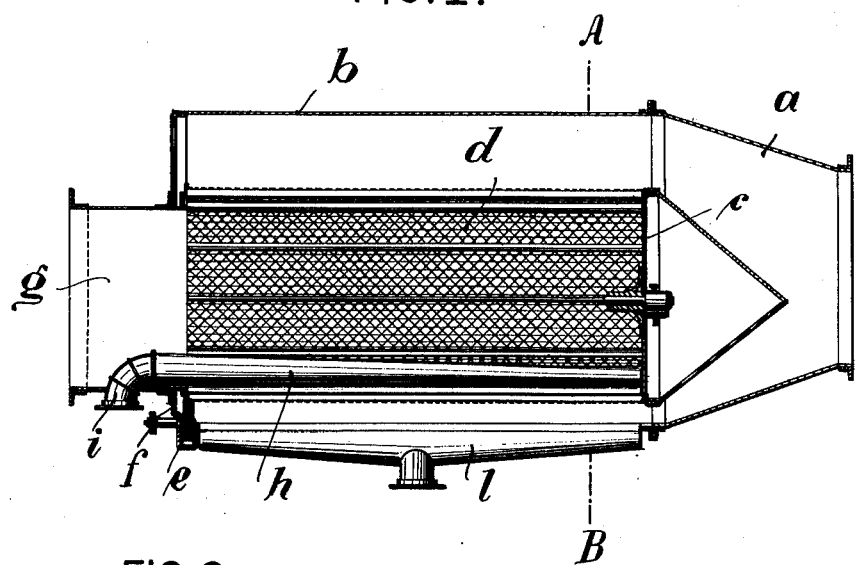
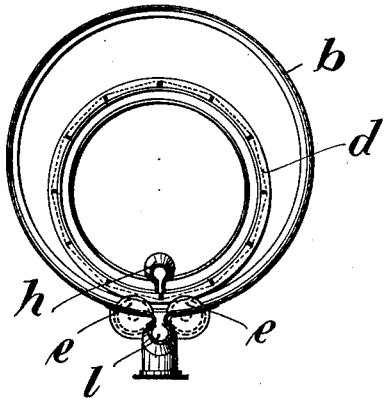
Witnesses:
Inventor:

UNITED STATES PATENT OFFICE.

HUBERT WINKLER, OF MOSCOW, RUSSIA.

AIR-FILTER.

1,002,618.   Specification of Letters Patent.   Patented Sept. 5, 1911.

Application filed April 5, 1911. Serial No. 619,158.

*To all whom it may concern:*

Be it known that I, HUBERT WINKLER, of Warwarka Haus Gribow, Moscow, Russia, have invented certain new and useful Improvements in Air-Filters; and I do hereby declare the following to be a full, clear, and exact description of the invention, such as will enable others skilled in the art to which it appertains to make and use the same.

The known air-filters are without any simple automatically acting device for cleansing the filtering cloth, so that the filtering surface of existing filters must be made exceedingly large from the outset, in order that their action may not cease too quickly, and consequently these filters are so large that it is often impossible to put them up in the factory.

The distinguishing feature of the new filter is the arrangement of a rotary filtering cylinder situated with its axis in the direction in which the air is introduced and the arrangement of a fixed nozzle-like pipe in the interior of the filtering cylinder, by which pipe compressed air is blown through the filtering cloth to a dust removing pipe. Consequently the filtering surface can be made much smaller than in the known filters, and the filter be of such a form that it can be built into any dust-removing conduit, only forming a thickening of the conduit.

The invention is shown in the drawing, Figure 1 being a longitudinal section of the air-filter, and Fig. 2 a transverse section of the same through A. B. in Fig. 1.

The filter consists of the cylinder $c$ that is covered with filtering cloth $d$ and arranged in the cylindrical casing $b$ in which the air charged with dust enters through the opening $a$, the shock of the air that occurs against the closed end of the filtering drum or cylinder $c$ being taken up and diverted by the cone $m$ that is constructed in front of this cylinder. The air charged with dust is then forced through the filtering cloth $d$ into the interior of the cylinder $c$ and passes out in a purified state through its open end, which joins the pipe junction $g$ of the filter casing $h$.

For cleansing the filtering cloth from the dust that is deposited thereon from outside, a pipe $h$ is arranged in the cylinder $c$. This pipe is provided with a nozzle shape slot, the length of which is the same as the width of the filtering surface. At $i$ in this pipe $h$ fresh air is blown in by means of a high pressure fan. This air passes in a kind of blade like stream out of the slot in the pipe $h$, and through the filtering cloth in an opposite direction to the air charged with dust. The dust blown in this way from the filtering cloth passes into the pipe $l$, that lies parallel to the pipe $h$ and is also furnished with a slot. From this the dust can be conveyed to a place for depositing it.

The filtering drum $c$ is pivotally mounted, its closed end being in a bearing, the other end lying loosely on the rollers $e$, $e$ which are actuated from $f$, every part of the filtering cloth being always cleaned again by the stream of air from the high pressure fan and therefore the filtering cloth always retains the same filtering action.

Having now particularly described and ascertained the nature of my said invention, and in what manner the same is to be performed, I declare that what I claim is:

1. An air-filter comprising in combination, a longitudinally slotted cylindrical casing provided with an air inlet at one end, a cylindrical filtering structure revolubly mounted eccentrically within said casing, provided with an air outlet at one end, a closure at the opposite end and including a peripherally disposed filtering material, the filtering structure being revolubly mounted with its eccentricity bringing the said filtering material in close proximity with the said slot in said cylindrical casing, and an air pressure exhaust pipe provided with a discharge slot in close proximity with the said filtering material and in alinement with the said slot in said cylindrical casing.

2. An air-filter comprising in combination, a longitudinally slotted cylindrical casing provided with an air inlet at one end, a dust-collecting means in communication with the said slot in said casing, a cylindrical filtering structure revolubly mounted eccentrically within said casing, provided with an air outlet at one end, a closure at the opposite end and including a peripherally disposed filtering material, the filtering structure being revolubly mounted with its eccentricity bringing the said filtering material in close proximity with the said slot in said cylindrical casing, and an air pressure exhaust pipe provided with a discharge slot in close proximity with the said filtering material and in alinement with the said slot in said cylindrical casing.

In testimony whereof I have affixed my signature, in presence of two witnesses.

HUBERT WINKLER.

Witnesses:
GUSTAV E. HARLWIG,
JOHANN BIRKMANN.